(No Model.) 7 Sheets—Sheet 1.

N. L. ANDERSON.
TYPE WRITING MACHINE.

No. 554,567. Patented Feb. 11, 1896.

Fig. 1.

Attest:
F. H. Schott
A. M. Parkins

Inventor
Neal L. Anderson,
by Munie & Goldsborough
Attys (No Model.)
7 Sheets—Sheet 2.

N. L. ANDERSON.
TYPE WRITING MACHINE.

No. 554,567.
Patented Feb. 11, 1896.

Attest:
F. H. Schott
A. M. Parkins.

Inventor:
Neal L. Anderson
by Annie Goldsborough,
Attys.

(No Model.)
7 Sheets—Sheet 3.

N. L. ANDERSON.
TYPE WRITING MACHINE.

No. 554,567.
Patented Feb. 11, 1896.

Fig. 3.

Attest:
F. H. Schott
A. M. Parkins

Inventor
Neal L. Anderson
by Lennie & Goldsborough,
Attys

ANDREW B. GRAHAM, PHOTO-LITHO, WASHINGTON, D.C.

(No Model.)  7 Sheets—Sheet 5.

N. L. ANDERSON.
TYPE WRITING MACHINE.

No. 554,567.  Patented Feb. 11, 1896.

Attest:
F. H. Schott
A. M. Parkins

Inventor
N. L. Anderson
by Munnie & Goldsborough,
Attys (No Model.) 7 Sheets—Sheet 6.

N. L. ANDERSON.
TYPE WRITING MACHINE.

No. 554,567. Patented Feb. 11, 1896.

(No Model.) 7 Sheets—Sheet 7.
N. L. ANDERSON.
TYPE WRITING MACHINE.

No. 554,567. Patented Feb. 11, 1896.

Attest:
F. H. Schott
A. M. Parkins

Inventor:
N. L. Anderson
by Venice & Goldsborough
Attys.

UNITED STATES PATENT OFFICE.

NEAL LARKIN ANDERSON, OF MONTGOMERY, ALABAMA.

TYPE-WRITING MACHINE.

SPECIFICATION forming part of Letters Patent No. 554,567, dated February 11, 1896.

Application filed July 9, 1895. Serial No. 555,403. (No model.)

*To all whom it may concern:*

Be it known that I, NEAL LARKIN ANDERSON, a citizen of the United States, residing at Montgomery, in the county of Montgomery and State of Alabama, have invented certain new and useful Improvements in Type-Writing Machines; and I do hereby declare the following to be a full, clear, and exact description of the invention, such as will enable others skilled in the art to which it appertains to make and use the same.

My invention relates to certain new and useful improvements in type-writing machines, and contemplates, particularly, novel means for returning the platen-carriage of the machine after it has been advanced from its initial position, this return being accomplished either automatically when the carriage has advanced to a predetermined position—as, for instance, the full end of the line—or manually at the will of the operator, at any point in advance of that determined by the adjustment of the automatic devices, and through the instrumentality, for instance, of an auxiliary key.

The invention also includes means for automatically turning the platen to provide for the spacing of the lines; and, further, means for storing and maintaining energy in the spring which gives momentum for the transverse movement of the carriage.

In the accompanying drawings, illustrative of my invention, Fig. 4 represents a sectional elevation of the machine, on the line 4 4 of Fig. 5, with the carriage in an intermediate position. Fig. $4^a$ represents a detached view of the means, actuated by the auxiliary key, for effecting the release and return of the carriage at any point in the line. Fig. 5 represents a horizontal section on the line 5 5 of Fig. 3. Fig. $5^a$ represents a section on the line $5^a$ $5^a$ of Fig. 5. Fig. 9 represents in detail the means employed for cushioning the impact of the transmitting pin or stud of actuating-gear upon the corresponding pin of the band-drum. Fig. $9^a$ represents a sectional view of a portion of the power-wheel and of the drum, and shows particularly the relationship of the pin on the wheel to the impact-cushioning spring on the drum. Fig. $9^b$ represents a corresponding face view of the portion of the drum to which the impact-cushioning spring is attached.

Similar letters of reference indicate similar parts throughout the several views.

For purposes of illustration I have shown my invention as applied to the well-known double-case Remington machine No. 2, and have omitted from the drawings such parts of the machine as are not needed to illustrate my invention. I desire it to be understood, however, that I do not limit myself to this particular type of machine, as it will be obvious to those skilled in the art that the improvements may be applied to other machines of the same general class.

Referring to the drawings, A represents the frame within which the keys $a$ are mounted.

A' represents the top plate of the frame, and A² the supporting and connecting uprights therefor.

In the rear of the machine is the customary supporting-bracket N, upon which is mounted the bell B.

The rock-shaft $b$, the dogs $c$, and the tension-spring $b'$ in connection with the rocker-bar $b^2$, links $b^3$, and universal bar $b^4$ constitute the usual escapement for the rack-bar $e$ of the platen-carriage C. The rack-bar $e$ is adapted to be tilted out of engagement with the dogs $c$. A drum E mounted loosely upon an arbor $f$ and provided with a flexible strap $f'$, extending from the drum periphery to a projection from the carriage C, occupies the position usually occupied by the spring-actuating drum of the ordinary Remington No. 2 machine and turns upon the shaft in the way the usual spring-drum turns, but in an opposite direction during the writing of a line. It is provided with a hub such as is used on the usual mainspring-drum, and on this hub turns the usual ratchet $e'$, the teeth of the ratchet being cut so as to face opposite the teeth of the usual ratchet, this being due to the fact that the drum E turns in an opposite direction to that of the mainspring-drum in the present type of machine. The shaft $f$ is provided with a collar $f^2$, to which one end of coil-spring $f^3$ is connected, the opposite end of said coil-spring being connected to a wheel F mounted loosely upon the collar $f^2$. A washer $f^4$ is interposed between the wheel F and the spring $f^3$, and serves in connection with the pins $f^8$ (see Fig. 9) to hold the spring $f^3$ in place.

Figures 9, 9A, 9B:
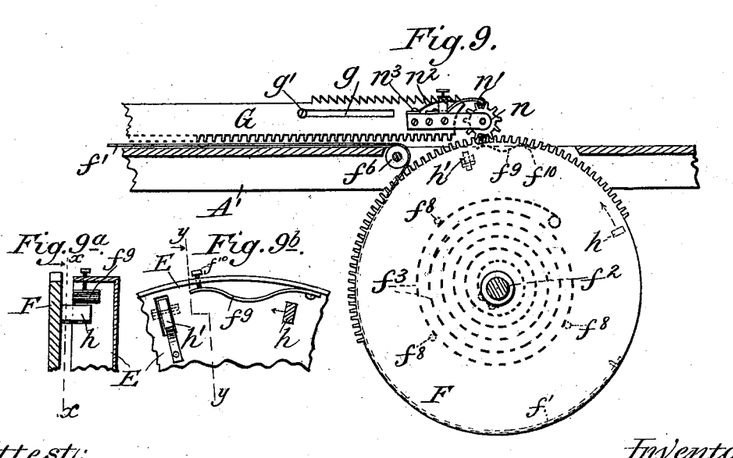

About one-half of the periphery of the wheel F is provided with cog-teeth having a pitch of one-tenth of an inch and cut to intermesh with the teeth of a toothed bar G. The bar G is provided with longitudinal slots $g$, and is connected to the bearings of the spacing-ratchet $e$ by means of headed screws $g'$ entering the lugs $g^2$. The flexible band $f'$ passes over a loosely-turning friction-roller $f^6$, and is connected to the periphery of the drum E at $f^7$. Near the periphery of the wheel F a pin $h$ projects therefrom within the rim of the drum E. The drum E is provided with a co-operating pivoted pin $h'$, which is held in position by the spring $x$, so that the said pin $h'$ normally occupies the position indicated in full lines in Fig. 6.

To the inner periphery of the flange of the drum E is secured a spring $f^9$ made adjustable by means of the set-screw $f^{10}$, said spring $f^9$ being interposed in the path of movement of the pin $h$ toward the pin $h'$ and serving as a buffer to lessen the impact of the pin $h$ upon the pin $h'$. (See Figs. 9ª and 9ᵇ.) To one of the uprights A² of the frame is pivoted at $b^{15}$ a bar $b^5$, connected by a link $b^6$ with a lever-arm $b^7$ of an auxiliary key $c^9$. A link $b^8$ connects the bar $b^5$ with a pivoted arm $b^9$, which is normally held upward by a spring $b^{10}$ and terminates at its free end in the form of a brake-shoe $b^{11}$, adapted to bear upon the periphery of the wheel F, so that when the auxiliary key is depressed for the purpose of releasing the wheel F, as will be hereinafter described, the brake-shoe simultaneously exerts a light pressure upon the power-wheel F, serving as a brake upon it.

Figures 4, 4A:
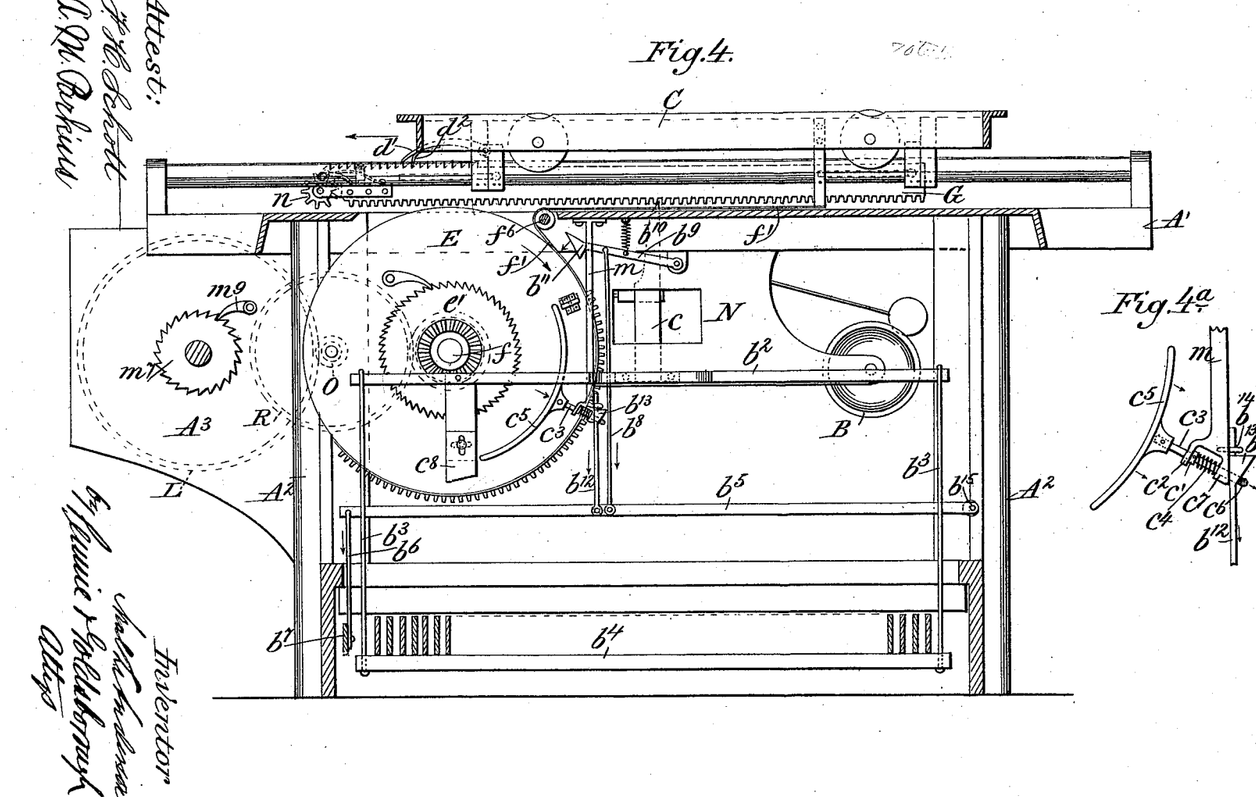
Figures 5, 5A:
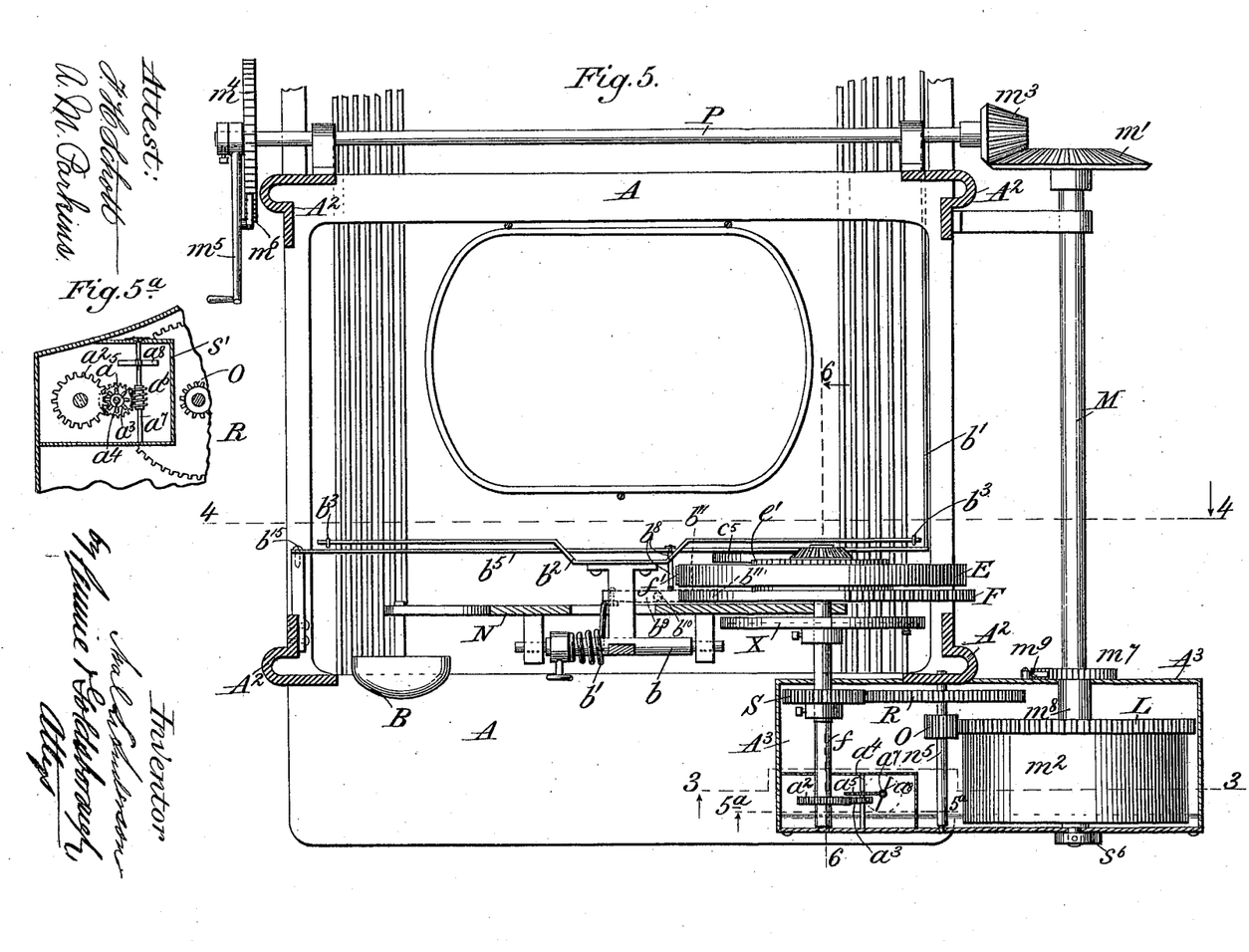
Figure 6:
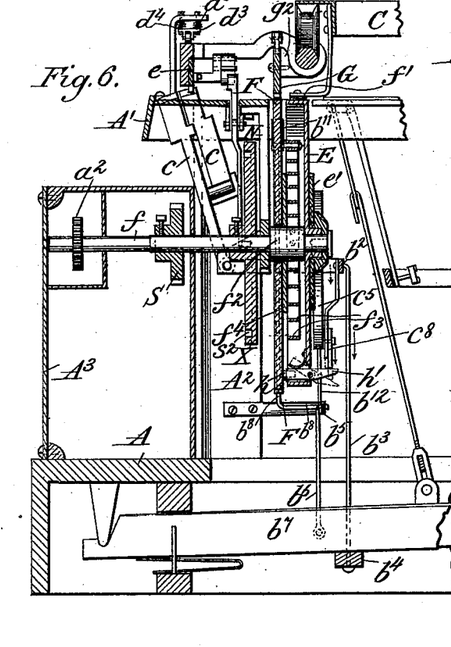
Fig. 6 represents a section on the line 6 6 of Figs. 2 and 5.
Figure 7:
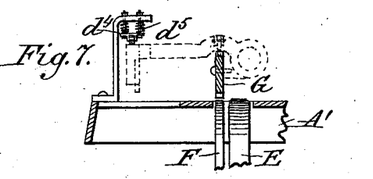
Fig. 7 represents a detached view of the means for preventing the rack from moving upward out of engagement with its driving-gear and for cushioning the upward impact of said gear upon the rack.
Figure 8:
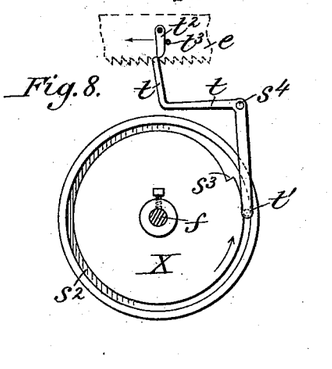
Fig. 8 represents in detail a part of the mechanism for storing energy in the carrriage-actuating spring during the return movement of the carriage.

From the bar $b^5$ extends upwardly a link $b^{12}$, provided at its upper end with a wedge-shaped projection $b^{13}$ and guided by passing through an eye $b^{14}$ of the hanger $m$. The hanger $m$ is provided at its lower end with a yoke whose two arms $c^2$ $c^7$ are perforated for the passage of a shank $c^3$. The shank $c^3$ is provided with a collar $c'$ and is encompassed by a spring $c^4$, whereby it is normally held in the position indicated in Figs. 4 and 4ª. At one end it bears the circular tripping-arm $c^5$, and at the opposite end is provided with an eye $c^6$, through which the link $b^{12}$ passes. It will be apparent that upon a downward movement of the bar $b^5$ the wedge portion $b^{13}$ of the link $b^{12}$ will cause the tripping-arm $c^5$ to move toward the periphery of the drum E and will thereby cause said tripping-arm to tilt the pin $h'$ out of engagement with the pin $h$, as indicated in Fig. 6.

I will now describe the manner in which the parts thus far enumerated operate.

Figure 1:
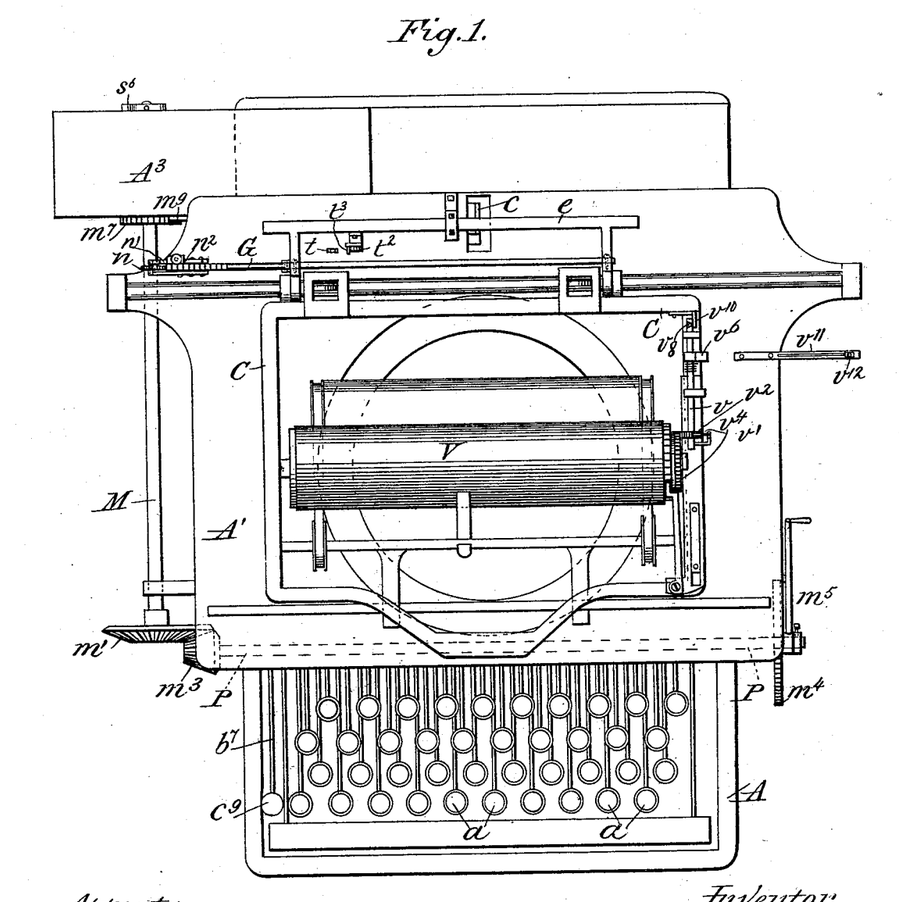
Figure 1 represents, partly broken away, a top plan view of a type-writing machine embodying my improvements, certain minor parts of the machine, unnecessary to the understanding of the present invention, being omitted.
Figure 2:
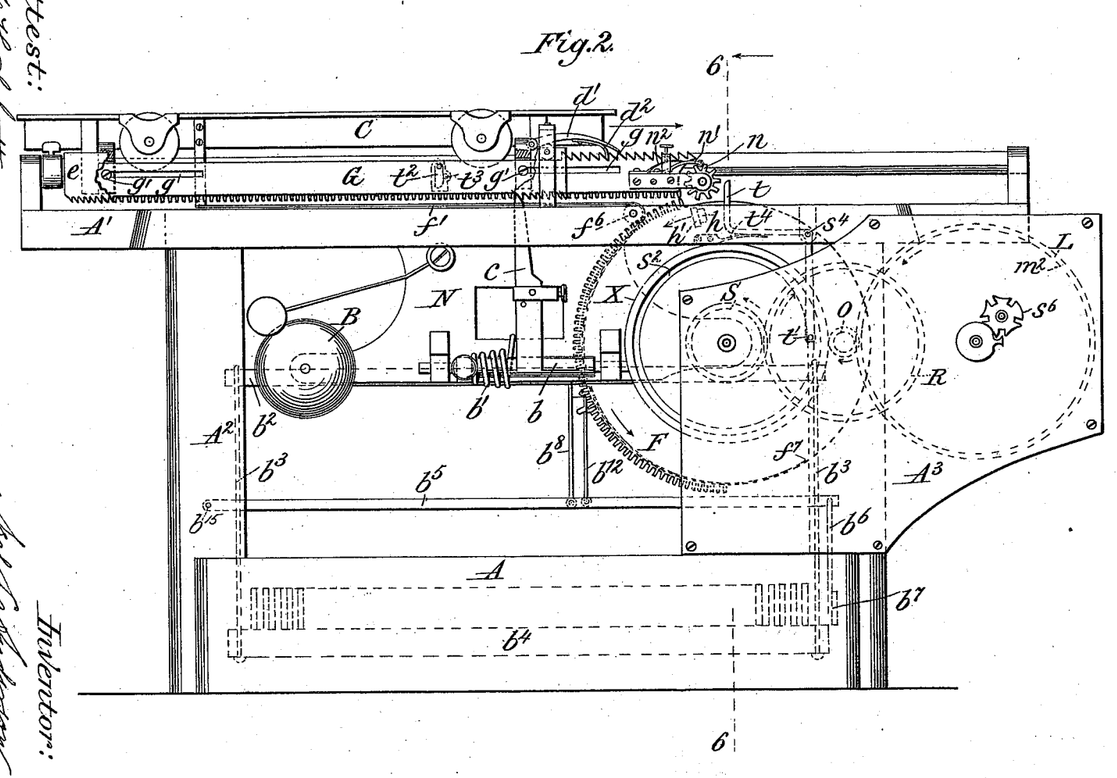
Fig. 2 represents, on a somewhat larger scale, a rear elevation of the machine, partly in section and partly broken away, the platen being removed from the carriage and the carriage being shown in position to begin its movement in printing a line.
Figure 3:
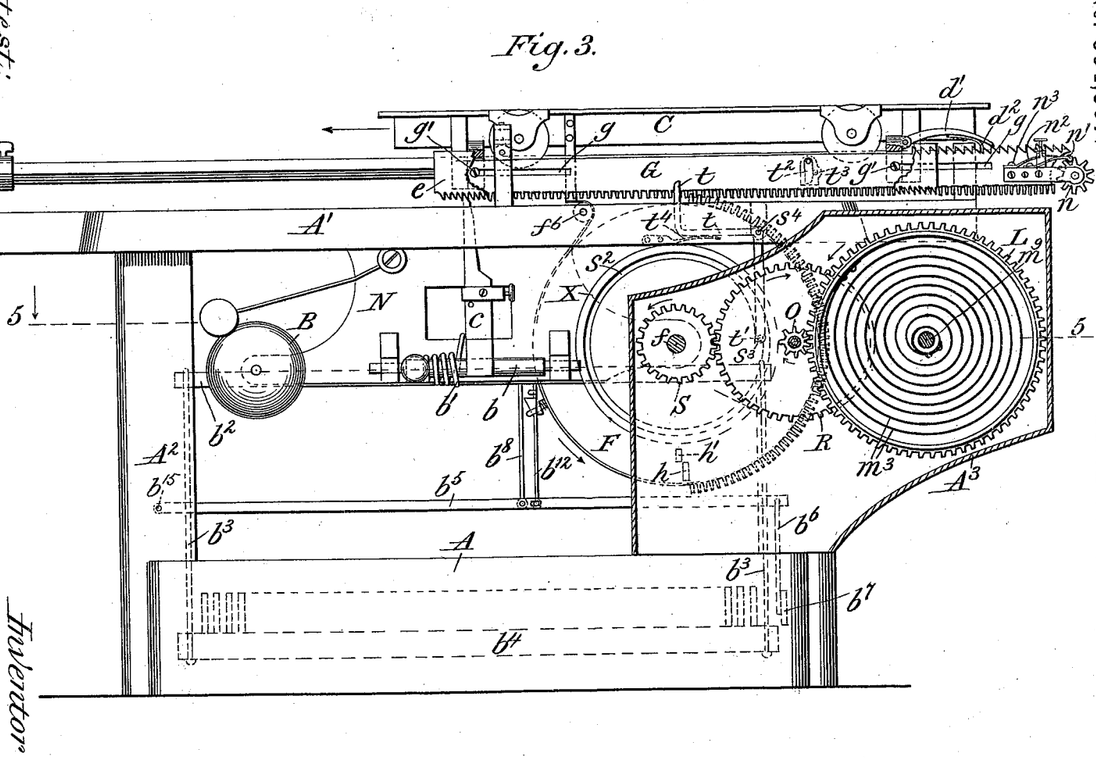
Fig. 3 represents a similar view, partly in section, on the line 3 3 of Fig. 5, showing the carriage ready to begin its return movement after the line has been written.

While a line is being written the drum E turns in the direction indicated by the arrow in Fig. 2. This motion is communicated to the drum E, which is loose on the shaft $f$, from the wheel F by means of the pin $h$ coming into contact with the pin $h'$. As each key is struck the drum E draws the carriage by means of the band $f'$ from the right to the left hand side of the type-writing machine step by step. This movement is not interfered with by the toothed bar G or the wheel F from the fact that while the carriage is moving from right to left the milled-out portion of the wheel F is next to the toothed bar G. When the end of the line has been reached, the last key struck (no matter which it may be) brings the trip-lever $c^8$, which projects downwardly from the bar $b^2$, into contact with the pin $h'$, thereby throwing said pin out of engagement with the pin $h$. The pin $h$ is at once carried beyond the pin $h'$, and the drum is now free to move to a direction contrary to its former path of revolution. This reverse movement of the drum E is caused by the return of the carriage to the right-hand side of the machine, for at the same moment that the pin $h$ is released from engagement with the pin $h'$ the teeth on the wheel F gear with the toothed bar G and drive the carriage from the left to the right—i. e., to the beginning of the line. As the right-hand side of the machine is nearly reached, the pin $h$ again approaches the pin $h'$, and when the return movement has been fully accomplished the last tooth of the toothed bar G passes out of engagement with the wheel F and the pin $h$ comes into contact again with the pin $h'$ and transmits to it power for beginning the next line.

Should the operator desire to return the carriage to the beginning of a new line from any point in the line beyond number 20 on the front scale of the type-writing machine, and without going entirely to the end of the line, a stroke of the auxiliary key $c^9$ will accomplish the purpose, the shank $c^3$ bringing the crescent-shaped trip $c^5$ against the pin $h'$, thus releasing the pin $h$ and thereby disengaging the wheel F from the drum E. The wheel F thus released continues its revolution, bringing the cogs on its periphery into engagement with the toothed bar G and returning the carriage to the left, as above described. The wheel F, being frequently released from engagement with the drum E when the carriage is at some distance from the end of the line, would have to describe an arc of considerable amplitude before its first cog came into engagement with the cogs on the toothed bar G. Consequently the first cog to come into engagement with the toothed bar G would receive a sharp blow from the sudden impact. To obviate this the brake-shoe $b^{11}$ is brought against the milled-out part of the periphery of the wheel F at the same time that the pin $h'$ is released from engagement with the pin $h$ by means of the auxiliary key, and thus serves as a gentle brake for the wheel F.

As hereinbefore described, the rack-bar G is fastened to the bearings of the spacing-ratchet $e$ instead of being fastened to the carriage itself. The bar, therefore, does not interfere with the lifting of the carriage to see the writing, as the carriage is entirely independent of the bar. The pin-and-slot connection of the bar G to the lugs $g^2$ permits endwise movement of the bar G and permits it to be adjusted. Co-operating with ratchet-teeth on the upper edge of the bar G is the pawl $d'$ pivoted to the frame of the spacing-ratchet. This pawl drops into engagement with the ratchet-teeth on the bar G, but lacks one-tenth of an inch of reaching the bottom of the teeth. A spring $d^2$ is fastened to the pawl $d'$ and engages with the preceding tooth, thereby holding the rack-bar exactly one-tenth of an inch to the left until the teeth on the wheel F come in contact with the first tooth of the toothed bar G, whereupon the toothed bar G is driven one-tenth of an inch to the right against the cushioning action of the spring $d^2$, before the carriage begins to move. The spring $d^2$ restores the toothed bar G to its original position, when the bar is out of gear with the wheel F. The wear upon the first cog of the wheel F is reduced to a minimum, not only in paragraphing, but at all times, since two cogs instead of one are in gear when the carriage actually begins its return movement.

It is evident that in case of paragraphing, as hereinbefore described, the cogs of the wheel F coming into gear with the toothed bar G before it has reached the end of its movement from right to left, when the carriage has been driven to the left in its return movement, there will not be a sufficient number of cogs on the toothed bar G to engage with all the cogs on the wheel F. The remaining cogs on the wheel F now having no work to do, as the toothed part has passed beyond them, (see Fig. 4,) would allow the pin $h$ to come into contact with the pin $h'$ with a sharp stroke. To obviate the force of this impact I make use of the spring $f^9$ as a buffer, as hereinbefore described.

An additional safeguard against the force of the sharp impact of the pin $h$ against pin $h'$ is provided by the pinion-wheel $n$ mounted to revolve freely in bearings projecting from the end of the toothed bar G. The teeth on this pinion-wheel $n$ are cut to gear with the teeth of the wheel F, and the pinion-wheel is provided with the friction-roller pawl $n'$ held in place by the spring $n^2$ and capable of adjustment by the screw $n^3$. If now the auxiliary key has been struck, thereby releasing the toothed bar G from engagement with the wheel F, the pin $h$ and pin $h'$ being still some distance apart, would come together with a sharp impact. This impact, however, as before described, is moderated by the spring $f^9$, and also by the pinion-wheel $n$, which comes into gear with the remaining teeth of the wheel F and, owing to the resistance offered by the spring on the friction-roller pawl, the momentum of the wheel F is checked, thereby permitting the pins $h$ and $h'$ to come together without causing any jar to the mechanism.

In order to avoid any upward movement of the toothed bar G when the teeth on the wheel F first come into gear with the teeth of the toothed bar G, I provide an antifriction-roller $d^3$ adapted to revolve loosely in bearings $d^4$, which bearings have a capacity for vertical movement, as indicated. The antifriction-roller rests upon the upper surface of the ratchet-bar $e$ and revolves within its bearings as the said ratchet-bar passes beneath it. Springs $d^5$ serve to resist any tendency of the bar G to rise out of gear with the wheel F and yet allow the spacing-ratchet $e$ to be lifted by the usual lever-arm out of engagement with the spacing-dogs $c$ to draw the carriage backward or forward during the writing of a line.

It will, of course, be understood that the pitch of the teeth on the spacer-ratchet $e$ and on the toothed bar G is the same, each having a pitch of thirty-two—i. e., ten teeth to the inch—and sixty-five teeth being provided for gear F when the invention is embodied in a Remington No. 2 machine. There is, therefore, no possibility of a failure of the teeth on the wheel F to mesh with the teeth on the bar G.

In the rear of the machine I provide a boxing or casing $A^3$, within which is contained the winding-gear for maintaining the power in the spring $f^3$. This box or casing is preferably cast in a single piece with the exception of one side, which is removably held in place by means of screws, as shown in Fig. 2. Within the casing $A^3$ is located the spur-gear L having ninety-six teeth, more or less, and to this gear is made fast the spring-barrel $m^2$. The spring inclosed in this barrel is made fast at one end to the inner periphery of the spring-barrel and at the other end to the shaft of the gear L. A winding-rod M passes through the spring-barrel and extends to the front of the machine, being held in suitable bearings, as shown. This winding-rod is provided with a bevel-gear $m'$ intermeshing with a bevel-gear $m^3$ upon a cross-shaft P, which extends across the front of the machine, and which is provided with the ratchet $m^4$. An operating-handle $m^5$, provided with a push-pawl $m^6$, serves for actuating the ratchet $m^4$ and consequently the shafts P and M, which are thus adapted to receive rotation when the operating-lever $m^5$ is manually rotated. $m^7$ represents a ratchet fixed to the hollow shaft or sleeve $m^8$, which carries the gear L, and $m^9$ represents a retaining-pawl for said ratchet.

Intermeshing with the gear L is the pinion O, having twelve teeth, more or less. This pinion is fixed upon an arbor $n^5$, to which is also fixed the gear R, which intermeshes with the gear S, fixed to the same shaft $f$ to which the spring $f^3$ is made fast. A suitable form of escapement is contained within a framework $s'$, located within the casing $A^3$. This escapement is of the ordinary type used in music-boxes, and consists, for instance, of a gear $a^2$ fixed upon the shaft $f$ and gearing with the pinion $a^3$ fixed upon an arbor $a^4$, said arbor having mounted upon it a worm-wheel $a^5$. The worm-wheel $a^5$ intermeshes with a worm $a^6$ upon an arbor $a^7$, which arbor is provided with the usual small fly or fan governor $a^8$, such as is used in music-boxes to regulate the speed. It will, of course, be understood that the escapement mechanism described is for the purpose of regulating the speed of the train of gearing when the winding mechanism is at work.

Upon the shaft $f$ and between the wheel S and wheel F is the cam-wheel X. This cam-wheel is provided with a slot $s^2$ cut in its face. The slot is cut in a true circle concentric with the periphery of the wheel X, except at $s^3$, where it terminates in a cut-out portion. To the frame of the machine is pivoted at $s^4$ a bell-crank lever $t$, which passes through the top plate of the frame. On the lower end of this bell-crank lever is a pin $t'$, and on the inner side of the spacing-ratchet $e$ is the trip-pawl $t^2$, having a back-stop pin $t^3$.

In putting together the parts of the machine the spring $f^3$ is given sufficient tension to write readily one line, and no more, and the power-spring $m^2$ is wound up by giving several revolutions to the rod M by means of the operating-handle $m^5$ and its connecting shaft and gearing. When the end of the line is reached and the power-wheel F is released from the drum E by the trip $c^8$, connected to the universal bar coming into contact with the movable pin $h'$ and tilting it out of engagement with the pin $h$, (or at some other portion of the line when the cresent-shaped trip $c^5$, connected to the auxiliary key $c^9$, is actuated to effect the same disengagement,) the power-wheel F continues its revolution, thereby bringing its peripheral cog-teeth into gear with the cog-teeth of the rack-bar G, thus returning the carriage to the beginning of the line, as hereinbefore described, whereupon, as the carriage is thus returning to the beginning of the line, the trip $t^2$ strikes the bell-crank lever $t$, thus releasing the pin $t'$ from the notch $s^3$. Thereupon the spring $m^2$, through the intermediacy of the connecting-gearing, winds the spring $f^3$. The spring $t^4$ under the dog or lever $t$ holds the lever in the slot $s^2$ in such manner that when the gear S is revolved once the pin $t'$ again engages with the notch $s^3$ and stops the further action of the spring $m^2$. In this manner the spring $f^3$ is wound once with each complete revolution of the cam-wheel X, this being exactly sufficient to maintain the energy it had when the line was begun. Thus energy is stored for writing a new line each time the carriage returns and for returning the carriage to the beginning of the following line. While the line is being written, however, the stored power is held out of action by means of the cam-wheel and bell-crank lever and has nothing to do with the writing of the line. Thus all of the advantages of easy stroke and adjustment of the stroke and power to suit the requirements of the individual writer are preserved as in the present machine.

To avoid storing too much energy in the power-spring $m^2$, it is desirable that the said spring be wound whenever a page is changed in the machine, this winding operation taking but a moment. Should the page have been only partially written, the Geneva stop $s^6$ prevents overwinding. In a gear of the size indicated in the drawings about three revolutions of the rod P would be sufficient for an entire page of twenty-seven lines written on the ordinary Remington machine No. 2. The number of revolutions necessary to wind the rod for writing a page may be increased by changing the size of the gears $m'$ $m^3$.

By the employment of gear of different diameters the power-spring is wound sufficiently for an entire page by one or two revolutions of the winding-crank. This multiplying gearing is of great practical importance, as it does away with the usual objection to winding mechanism—namely, that it takes too long to store the power therein.

Figure 10:
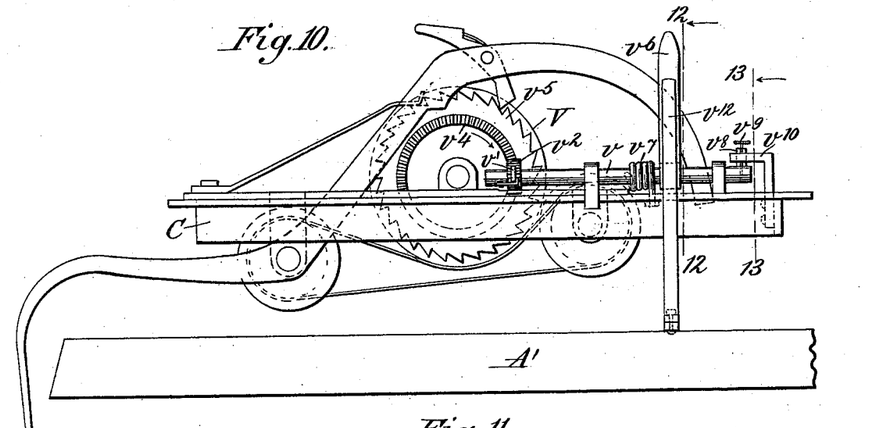
Fig. 10 represents in side elevation the means for automatically effecting the line-spacing.
Figure 11:
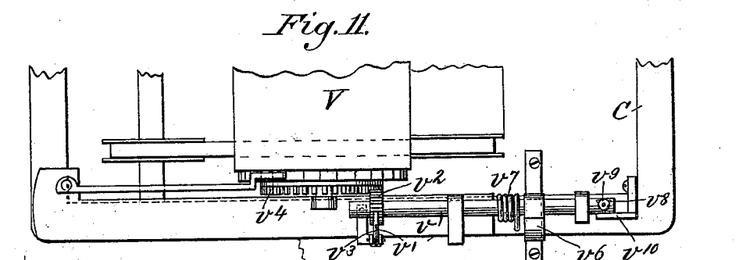
Fig. 11 represents a plan view thereof.
Figures 12, 14, 15, 16, 17:
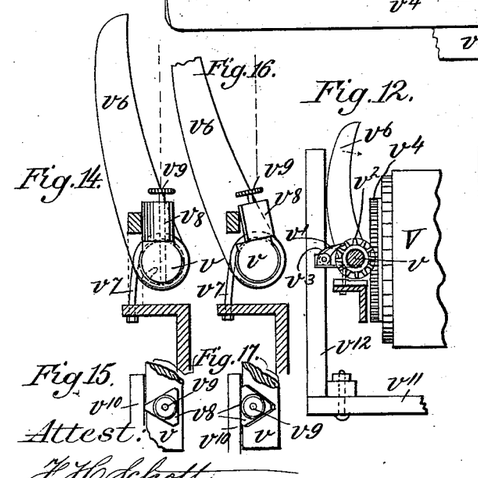
Fig. 12 represents a section on the line 12 12 of Fig. 10 at the moment that the carriage has reached the end of a line.
Figs. 14 and 15 represent in elevation and in plan, respectively, the adjustment of the automatic line-spacing devices for turning the platen a single space.
Figs. 16 and 17 represent like views wherein the parts are adjusted for turning the platen two spaces.
Figure 13:
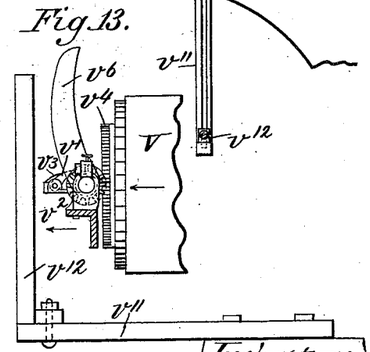
Fig. 13 represents a like view on the line 13 13 just before the carriage has reached the end of a line.

In order to effect the automatic turning of the carriage-platen V so as to space for the succeeding line, I provide the devices more particularly shown in Figs. 10 to 17 of the drawings. A rock-bar $v$ is mounted in suitable bearings upon the carriage-frame, as shown. Upon this rod is the pushing and holding pawl $v'$, which is held against the cogs on the loose pinion-wheel $v^2$ by means of a spring $v^3$. The pinion-wheel $v^2$ gears into a crown-gear $v^4$ on the right-hand platen-head ratchet $v^5$. A finger $v^6$ is fixed upon the rock-bar $v$, and a spiral spring $v^7$ is fastened at one end to the rock-bar $v$ and at the other end to the carriage-frame C, said spring tending to rock the bar $v$ outwardly and being restrained by means of an adjustable stop. This stop consists of a three-cornered stud $v^8$ mounted on the rock-bar $v$ and adapted to be rotated thereon upon a pivot-pin which is provided at its upper end with a milled head $v^9$. Upon the carriage-frame is a lug or projection $v^{10}$, which is fastened rigidly to the carriage-frame. Projecting from the top plate of the frame of the machine is a right-angled projection $v^{11}$, slotted longitudinally and having an adjustable upright $v^{12}$ located in the path of movement of the advancing finger $v^6$. As the carriage approaches the end of a line the finger $v^6$ strikes the projection $v^{12}$ and consequently turns the rock-bar $v$ within its bearings, thereby causing the pinion-wheel $v^2$ to turn the platen V. When the finger is released by the movement of the carriage to the left again, the spiral spring $v^7$ restores the rock-bar to its original position, thus bringing the pawl $v'$ into engagement with another of the cogs of the pinion-wheel $v^2$ and therefore ready for spacing the next line. The stud $v^8$ is flat upon its three sides, and its angular edges are likewise slightly flattened. The spacing of the lines apart is regulated by the position of adjustment of the stud $v^8$. Thus when the flat surface of the lug is turned toward the stop $v^{10}$, as indicated in Figs. 16 and 17, the rock-bar is permitted to turn a distance equal to two line-spaces, whereas when one of the angles of the stud $v^8$ is turned toward the stop $v^{10}$ the rock-bar $v$ can turn a distance equal to only one line-space. I contemplate retaining the usual hand-lever and spacing-pawl, as indicated in Fig. 10, so that in addition to the automatic spacing I may have means at hand to space the lines manually.

So far as I am aware, it is broadly new in my invention to employ the same spring both as the forwarding and automatic returning motive power for the platen-carriage. It is also broadly new to employ a power-wheel (driven by any power whatever) rotating in one and the same direction, said wheel during the first part of its rotation imparting step-by-step forward movement to the carriage, and, during the continuance of its said unidirectional rotation, imparting a continuous return movement to the carriage. These are the main characteristic features of my invention, and I desire that such of my claims as set them forth generically be given an interpretation only limited by and commensurate with the terms in which said claims are expressed.

Having thus described my invention, what I claim, and desire to secure by Letters Patent, is—

1. In a type-writing machine, the combination with the platen-carriage, of a spring for propelling the carriage forwardly by a step-by-step motion, and rearwardly by a continuous motion, and reversing-gear operated when the carriage reaches the end of the line of print to permit the same propelling-spring to return the carriage to its proper position for printing the next line; substantially as described.

2. In a type-writing machine, the combination with the platen-carriage, of a power-wheel for propelling the carriage forwardly by a step-by-step motion, and rearwardly by a continuous motion, means for imparting unidirectional rotation to the power-wheel, and reversing-gear operated when the carriage reaches the end of the line of print to permit the same power-wheel to return the carriage to its proper position for printing the next line; substantially as described.

3. In a type-writing machine, the combination with the platen-carriage, of a power-wheel for propelling the carriage forwardly by a step-by-step motion, and rearwardly by a continuous motion, means for imparting unidirectional rotation to the power-wheel, said power-wheel being mediately coupled to the platen-carriage at the initial position of the carriage, a trip for disengaging the coupling, and reversing-gear operated when the gear-carriage reaches the end of the line of print to permit the same power-wheel to return the carriage to its proper position for printing the next line; substantially as described.

4. In a type-writing machine, the combination with the platen-carriage, of a power-wheel, means for rotating said wheel in one and the same direction during the advance and return of the carriage, a band-wheel coupled thereto at the initial position of the carriage and connected to the carriage by a flexible band, a trip for disengaging the coupling, and gearing intermediate of the power-wheel and carriage adapted to intermesh and return the carriage upon the operation of the trip; substantially as described.

5. In a type-writing machine, the combination with the platen-carriage, of a power-wheel mediately coupled thereto at the initial position of the carriage, means for rotating said wheel in one and the same direction during the advance and return of the carriage, a trip for disengaging the coupling, said trip being connected with the universal bar, and gearing intermediate of the power-wheel and carriage adapted to intermesh and return the carriage, upon the operation of the trip; substantially as described.

6. In a type-writing machine, the combination with the platen-carriage, of a power-wheel mediately coupled thereto at the initial position of the carriage, a trip for disengaging the coupling, said trip being connected with the universal bar, an auxiliary trip having an independent operating-key, and gearing intermediate of the power-wheel and carriage adapted to intermesh and return the carriage upon the operation of either trip; substantially as described.

7. In a type-writing machine, the combination with the platen-carriage, of a power-wheel mediately coupled thereto at the initial position of the carriage, means for rotating the wheel in one and the same direction during the advance and return of the carriage, a trip for disengaging the coupling, gearing intermediate of the power-wheel and carriage adapted to intermesh and return the carriage, upon the operation of the trip, and auxiliary power-storage mechanism for supplying to said power-wheel with each return of the carriage energy sufficient both to forward the carriage and reverse it; substantially as described.

8. In a type-writing machine, the combination with the platen-carriage, of a power-wheel mediately coupled thereto at the initial position of the carriage, means for rotating the wheel in one and the same direction during the advance and return of the carriage, a trip for disengaging the coupling, gearing intermediate of the power-wheel and carriage adapted to intermesh and return the carriage, upon the operation of the trip, and auxiliary power-storage mechanism for supplying to said power-wheel with each return of the carriage energy sufficient both to forward the carriage and reverse it, and means for regulating said supply so as to restore to the power-wheel on each return of the carriage its original energy; substantially as described.

9. In a type-writing machine, the combination with the platen-carriage, of a power-wheel mediately coupled thereto at the initial position of the carriage, a trip for disengaging the coupling, gearing intermediate of the power-wheel and carriage adapted to intermesh and return the carriage, upon the operation of the trip, an auxiliary power-storage mechanism for supplying energy to said power-wheel with each return of the carriage, and means for regulating said supply so as to restore to the power-wheel on each return of the carriage its original energy, said means consisting of a cam-wheel on the master-shaft of the power-wheel, a stop engaging therewith, and a trip in the path of return movement of the carriage; substantially as described.

10. In a type-writing machine, the combination with the platen-carriage, of a power-wheel mediately coupled thereto at the initial position of the carriage, means for rotating the wheel in one and the same direction during the advance and return of the carriage, a trip for disengaging the coupling, gearing intermediate of the power-wheel and carriage adapted to intermesh and return the carriage, upon the operation of the trip, and auxiliary power-storage mechanism for supplying to said power-wheel with each return of the carriage energy sufficient both to forward the carriage and reverse it, said mechanism consisting of a spring-motor geared to the said power-wheel and provided with manually-operated winding-gear; substantially as described.

11. In a type-writing machine, the combination with the platen-carriage, of a power-wheel mediately coupled thereto at the initial position of the carriage, means for rotating the wheel in one and the same direction during the advance and return of the carriage, a trip for disengaging the coupling, gearing intermediate of the power-wheel and carriage adapted to intermesh and return the carriage, upon the operation of the trip, and auxiliary power-storage mechanism for supplying to said power-wheel with each return of the carriage energy sufficient both to forward the carriage and reverse it, said mechanism consisting of a spring-motor geared to the said power-wheel and provided with manually-operated winding-gear, having a Geneva stop to prevent overwinding; substantially as described.

12. In a type-writing machine, the combination with the platen-carriage, of a power-wheel mediately coupled thereto at the initial position of the carriage, means for rotating the wheel in one and the same direction during the advance and return of the carriage, a trip for disengaging the coupling, gearing intermediate of the power-wheel and carriage adapted to intermesh and return the carriage, upon the operation of the trip, and auxiliary power-storage mechanism for supplying to said power-wheel with each return of the carriage energy sufficient both to forward the carriage and reverse it, said mechanism consisting of a spring-motor geared to the said power-wheel and provided with manually-operated winding-gear, and a fan-governor; substantially as described.

13. In a type-writing machine, the combination with the platen-carriage, of a power-wheel having cog-teeth upon a portion of its periphery, a shaft upon which said wheel is loosely mounted, a volute spring connecting the wheel and shaft, a band-wheel mounted loosely on the shaft and connected to the carriage by a flexible band, a fixed pin on the power-wheel, a co-operating movable pin upon the band-wheel, a trip for moving the movable pin out of line with the fixed pin, and a toothed bar connected with the carriage in the path of movement of the power-wheel teeth; substantially as described.

14. In a type-writing machine, the combination with the platen-carriage, toothed power-wheel, and band-wheel, said power-wheel and band-wheel being coupled by a fixed pin and co-operating movable pin, of a trip for the movable pin consisting of a crescent-shaped arm, a spring normally holding said arm out of line with the movable pin, and a key for advancing said crescent-shaped arm against the tension of its spring and causing it to trip the movable pin; substantially as described.

15. In a type-writing machine, the combination with the platen-carriage, toothed power-wheel, and band-wheel, said power-wheel and band-wheel being coupled by a fixed pin and co-operating movable pin, of a trip for the movable pin consisting of a crescent-shaped arm, a spring normally holding said arm out of line with the movable pin, and a key for advancing said crescent-shaped arm against the tension of its spring and causing it to trip the movable pin, and a brake-shoe likewise connected with said key and brought into action simultaneously with the operation of said trip; substantially as described.

16. In a type-writing machine, the combination with the platen-carriage, of a power-wheel having cog-teeth upon a portion of its periphery, a shaft upon which said wheel is loosely mounted, a volute spring connecting the wheel and shaft, a band-wheel mounted loosely on the shaft and connected to the carriage by a flexible band, a fixed pin on the power-wheel, a co-operating movable pin upon the band-wheel, a trip for moving the movable pin out of line with the fixed pin, and a toothed bar connected with the carriage in the path of movement of the power-wheel teeth, and a buffer-wheel located at the end of the toothed bar and adapted to engage with the power-wheel cogs; substantially as described.

17. In a type-writing machine, the combination with the platen-carriage, of a power-wheel having cog-teeth upon a portion of its periphery, a shaft upon which said wheel is loosely mounted, a volute spring connecting the wheel and shaft, a band-wheel mounted loosely on the shaft and connected to the carriage by a flexible band, a fixed pin on the power-wheel, a co-operating movable pin upon the band-wheel, a trip for moving the movable pin out of line with the fixed pin, and a toothed bar connected with the carriage in the path of movement of the power-wheel teeth, and a spring connected to the inner periphery of the band-wheel in advance of its movable pin; substantially as described.

18. In a type-writing machine, the combination with the platen-carriage, of a power-wheel having cog-teeth upon a portion of its periphery, a shaft upon which said wheel is loosely mounted, a volute spring connecting the wheel and shaft, a band-wheel mounted loosely on the shaft and connected to the carriage by a flexible band, a fixed pin on the power-wheel, a co-operating movable pin upon the band-wheel, a trip for moving the movable pin out of line with the fixed pin, and a toothed bar connected with the carriage in the path of movement of the power-wheel teeth, said toothed bar having a limited longitudinal movement, and being provided with a spring, rack and back-stop pawl permitting it to recede the distance of one tooth upon receiving the impact of the power-wheel cogs; substantially as described.

19. In a type-writing machine, the combination with the platen-carriage, of a power-wheel having cog-teeth upon a portion of its periphery, a shaft upon which said wheel is loosely mounted, a volute spring connecting the wheel and shaft, a band-wheel mounted loosely on the shaft and connected to the carriage by a flexible band, a fixed pin on the power-wheel, a co-operating movable pin upon the band-wheel, a trip for moving the movable pin out of line with the fixed pin, and a toothed bar connected with the carriage in the path of movement of the power-wheel teeth, and a spring-seated friction-roller for holding the toothed bar and spacing-ratchet down against the upward impact of the power-wheel cogs; substantially as described.

20. In a type-writing machine, the combination with the platen-carriage and platen, the platen being provided with a gear, of a rock-shaft mounted on the carriage, a pinion loose upon the rock-shaft and meshing with the gear, a push-pawl for the pinion, a spring normally retracting the rock-bar, an operating-finger upon the rock-bar, and an abutment upon the type-writer frame in the path of movement of the finger; substantially as described.

21. In a type-writing machine, the combination with the platen-carriage and platen, the platen being provided with a gear, of a rock-shaft mounted on the carriage, a pinion loose upon the rock-shaft and meshing with the gear, a push-pawl for the pinion, a spring normally retracting the rock-bar, an operating-finger upon the rock-bar, and an abutment upon the type-writer frame in the path of movement of the finger, and an adjustable stop upon the rock-bar; substantially as described.

22. In a type-writing machine, the combination with the platen-carriage and platen, the platen being provided with a gear, of a rock-shaft mounted on the carriage, a pinion loose upon the rock-shaft and meshing with the gear, a push-pawl for the pinion, a spring normally retracting the rock-bar, an operating-finger upon the rock-bar, and an abutment upon the type-writer frame in the path of movement of the finger, and an adjustable stop upon the rock-bar consisting of a revoluble stud substantially of the shape of a triangular prism; substantially as described.

In testimony whereof I affix my signature in presence of two witnesses.

NEAL LARKIN ANDERSON.

Witnesses:
J. V. T. GASTON,
GASTON GUNTER.